(12) United States Patent
Zhou et al.

(10) Patent No.: US 11,035,720 B2
(45) Date of Patent: Jun. 15, 2021

(54) WARNING DEVICE FOR PREVENTING UNDERGROUND CABLES AGAINST ACCIDENTAL EXCAVATION

(71) Applicant: STATE GRID SHANGHAI MUNICIPAL ELECTRIC POWER COMPANY, Shanghai (CN)

(72) Inventors: Lijun Zhou, Shanghai (CN); Yunjie Zhou, Shanghai (CN); Xiaojuan Jiang, Shanghai (CN); Hong Min, Shanghai (CN); Tiecheng Lou, Shanghai (CN); Jinhua Yu, Shanghai (CN); Jia Chen, Shanghai (CN); Kaibo Ma, Shanghai (CN); Dekang Wen, Shanghai (CN); Ting Ye, Shanghai (CN); Qinqin Han, Shanghai (CN); Ran An, Shanghai (CN); Tianyu Yang, Shanghai (CN); Chenyang Xuan, Shanghai (CN); Yin Zhou, Shanghai (CN); Chenbin Wu, Shanghai (CN)

(73) Assignee: STATE GRID SHANGHAI MUNICIPAL ELECTRIC POWER COMPANY, Shanghai (CN)

( * ) Notice: Subject to any disclaimer, the term of this patent is extended or adjusted under 35 U.S.C. 154(b) by 0 days.

(21) Appl. No.: 16/466,972

(22) PCT Filed: Jun. 28, 2018

(86) PCT No.: PCT/CN2018/093299
§ 371 (c)(1),
(2) Date: Jun. 5, 2019

(87) PCT Pub. No.: WO2019/015454
PCT Pub. Date: Jan. 24, 2019

(65) Prior Publication Data
US 2020/0088566 A1 Mar. 19, 2020

(30) Foreign Application Priority Data
Jul. 21, 2017 (CN) .......................... 201710600261.0

(51) Int. Cl.
*G01H 9/00* (2006.01)
*H01B 7/18* (2006.01)

(52) U.S. Cl.
CPC ............ *G01H 9/004* (2013.01); *H01B 7/1805* (2013.01)

(58) Field of Classification Search
CPC combination set(s) only.
See application file for complete search history.

(56) References Cited

U.S. PATENT DOCUMENTS 4,839,898 A * 6/1989 Payne ..................... H01S 3/08
372/6
4,886,980 A * 12/1989 Fernandes ............ G01R 15/142
307/64

(Continued)

FOREIGN PATENT DOCUMENTS

| CN | 101965367 A | 2/2011 |
| CN | 104021638 A | 9/2014 |
| CN | 107490429 A | 12/2017 |

OTHER PUBLICATIONS

International Search Report of International Application No. PCT/CN2018/093299, dated Aug. 21, 2018, 5 pages, with English translation.

*Primary Examiner* — William H. Mayo, III
*Assistant Examiner* — Krystal Robinson
(74) *Attorney, Agent, or Firm* — Hamre, Schumann, Mueller & Larson, P.C.

(57) ABSTRACT

A warning device for preventing underground cables against accidental excavation comprises an optical fiber vibration sensor having a mode recognition function, a signal processing unit, a wireless communication unit and a power supply unit, wherein the signal processing unit is connected to the optical fiber vibration sensor, the wireless communication unit and the power supply unit, and the optical fiber vibration sensor is installed within a set range of a cable and is used to monitor vibration signals around the cable, so that (Continued)

once a behavior possibly endangering the cable occurs, an alarm is given out in time to reduce power transmission and transformation accidents. Compared with the prior art, the warning device has the advantages of low false alarm rate, rapid response and accurate localization region.

5 Claims, 1 Drawing Sheet

(56) References Cited

U.S. PATENT DOCUMENTS

| | | | | |
|---|---|---|---|---|
| 5,477,323 | A * | 12/1995 | Andrews | G01D 5/266 |
| | | | | 356/477 |
| 5,739,526 | A * | 4/1998 | Furstenau | G01B 11/043 |
| | | | | 250/221 |
| 6,711,440 | B2 * | 3/2004 | Deal | A61N 1/372 |
| | | | | 607/9 |
| 6,725,705 | B1 * | 4/2004 | Huebler | G01M 3/243 |
| | | | | 702/51 |
| 9,470,864 | B1 * | 10/2016 | Yo | G02B 6/4214 |
| 10,063,280 | B2 * | 8/2018 | Fuchs | H04B 17/345 |
| 2005/0169056 | A1 * | 8/2005 | Berkman | H04B 3/58 |
| | | | | 365/185.22 |
| 2012/0029846 | A1 * | 2/2012 | Heatley | G02B 6/4464 |
| | | | | 702/48 |
| 2015/0033865 | A1 * | 2/2015 | Rollinger | G01H 9/004 |
| | | | | 73/649 |
| 2018/0160947 | A1 * | 6/2018 | Hu | G01D 5/35374 |

* cited by examiner

WARNING DEVICE FOR PREVENTING UNDERGROUND CABLES AGAINST ACCIDENTAL EXCAVATION

TECHNICAL FIELD

The invention relates to safety monitoring technologies for underground power cables, in particular to a warning device for preventing underground cables against accidental excavation.

DESCRIPTION OF RELATED ART

Underground warning belts or vibration optical cables are usually used to prevent underground cables against accidental excavation, wherein the underground warning belts are ex-post warning measures and cannot realize online monitoring, while the vibration optical fibers can give an early alarm by monitoring the site condition in advance.

At present, MZ optical fiber interferometers, white-light optical fiber interferometers and mode-conversion optical fiber interferometers are three main mechanisms adopting vibration optical fibers to detect vibration, wherein the MZ optical fiber interferometers are high in sensitivity and capable of outputting different time-variant multi-frequency cosine wave trains under different events, and consequentially, it is difficult to determine an appropriate event criterion, and misinformation is frequently caused by environmental noise such as wind and rain; and the white-light optical fiber interferometers are similar to the MZ optical fiber interferometers in structure, adopt a broad-spectrum light source and output wave packets which move leftwards or rightwards with external vibration signals, but the signal-to-noise ratio of signals is poor due to the existence of environmental noise and circuit noise, and the false alarm rate is high.

BRIEF SUMMARY OF THE INVENTION

The objective of the invention is to overcome the defects of the prior art by providing a warning device for preventing underground cables against accidental excavation.

The following technical solution is adopted by the invention to fulfill the above objective:

A warning device used for preventing underground cables against accidental excavation comprises an optical fiber vibration sensor having a mode recognition function, a signal processing unit, a wireless communication unit and a power supply unit, wherein the signal processing unit is connected to the optical fiber vibration sensor, the wireless communication unit and the power supply unit, and the optical fiber vibration sensor is installed within a set range of a cable and is used for to monitor vibration signals around the cable in real time, so that once a behavior possibly endangering the cable occurs, an alarm is given out in time to reduce power transmission and transformation accidents.

The optical fiber vibration sensor having the mode recognition function is a mode-conversion optical fiber vibration sensor, and an output of the optical fiber vibration sensor varies with the vibration intensity and frequency.

The optical fiber vibration sensor comprises a photoelectric transmitter LD, a photoelectric receiver PD, a mono-mode optical fiber, a multi-mode optical fiber and a reflector, wherein the photoelectric transmitter LD and the photoelectric receiver PD are connected to one end of the mono-mode optical fiber, the other end of the mono-mode optical fiber is connected to one end of the multi-mode optical fiber, and the other end of the multi-mode optical fiber is connected to the reflector.

The photoelectric transmitter LD and the photoelectric receiver PD are connected to the mono-mode optical fiber via a coupler.

The mono-mode optical fiber and the multi-mode optical fiber are connected by welding.

A light entering the multi-mode optical fiber from the mono-mode optical fiber will be emitted in a fundamental mode. However, when the multi-mode optical fiber bends, the light turns into a high-order mode to be transmitted in the multi-mode optical fiber from the fundamental mode; when transmitted to the tail end of the multi-mode optical fiber, the light is reflected back by the reflector and is transmitted still in the high-order mode; and when transmitted to the mono-mode optical fiber, the light will be no longer in the fundamental mode and cannot reach the photoelectric receiver PD via the mono-mode optical fiber. In the case where the multi-mode optical fiber is disturbed, the light in the high-order mode turns into the fundamental mode when transmitted to the mono-mode optical fiber, so that a light signal is detected by the photoelectric receiver PD, and the light detected by the photoelectric receiver PD varies with the vibration of the multi-mode optical fiber. When the multi-mode optical fiber stops vibrating, a straight line is output by the photoelectric receiver PD.

Compared with the prior art, the invention has the following beneficial effects: the mode-conversion optical fiber vibration sensor is adopted, and the output of the mode-conversion optical fiber vibration sensor varies with the vibration intensity and frequency, so that the false alarm rate is low, quick responses are realized, and the localization region is accurate; and the optical fiber vibration sensor having the mode recognition function is installed near a cable to monitor vibration signals around the cable in real time, so that once a behavior possibly endangering the cable (such as mechanical excavation) occurs, an alarm is given out in time to reduce power transmission and transformation accidents.

DETAILED DESCRIPTION OF THE INVENTION

A clear and complete description of the technical solution of embodiments of the invention is given as follows in combination with the accompanying drawings of the embodiments. Apparently, the embodiments in the following description are only illustrative ones and are not all possible ones of the invention. All other embodiments achieved by those ordinarily skilled in this field based on these illustrative ones without creative labor should also fall within the protection scope of the invention.

A warning device for preventing underground cables against accidental excavation comprises an optical fiber vibration sensor having a mode recognition function, a signal processing unit, a wireless communication unit and a power supply unit, wherein the signal processing unit is connected to the optical fiber vibration sensor, the wireless communication unit and the power supply unit, and the optical fiber vibration sensor is installed within a set range of a cable and is used to monitor vibration signals around the cable in real time, so that once a behavior possibly endangering the cable occurs, an alarm is given out in time to reduce power transmission and transformation accidents.

The optical fiber vibration sensor having the mode recognition function is a mode-conversion optical fiber vibration sensor, and an output of the optical fiber vibration sensor varies with the vibration intensity and frequency.

Figure 1:
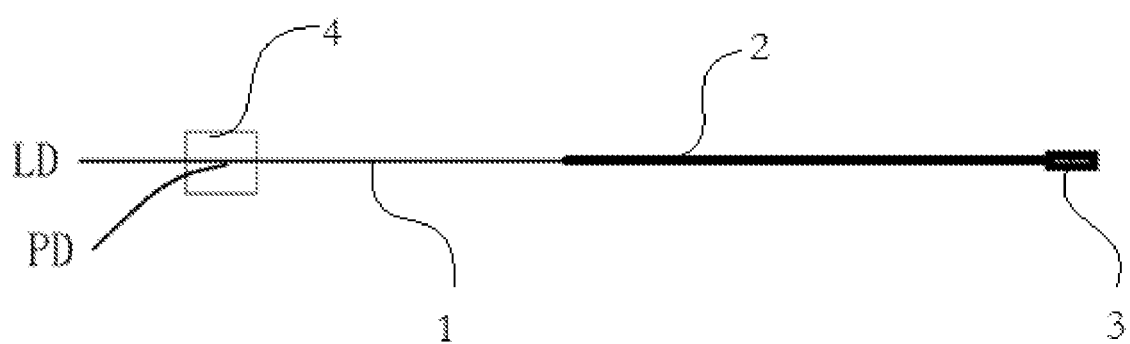
FIG. 1 is a schematic diagram a mode-conversion optical fiber vibration sensor of the invention.
Figure 2:
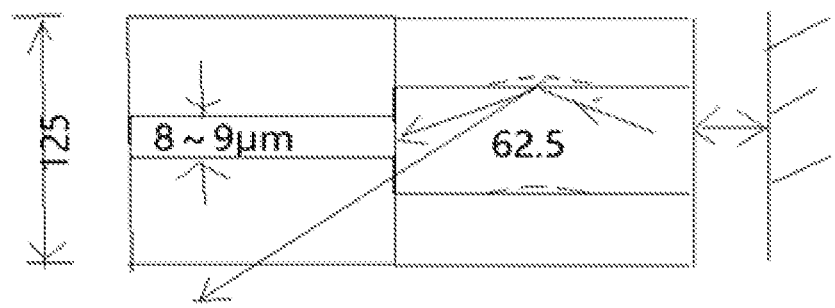
FIG. 2 is a schematic diagram of mode conversion.

As shown in FIG. 1, the optical fiber vibration sensor comprises a photoelectric transmitter LD, a photoelectric receiver PD, a mono-mode optical fiber 1, a multi-mode optical fiber 2 and a reflector 3, wherein the photoelectric transmitter LD and the photoelectric receiver PD are connected to one end of the mono-mode optical fiber 1, the other end of the mono-mode optical fiber 1 is connected to one end of the multi-mode optical fiber 2, and the other end of the multi-mode optical fiber 2 is connected to the reflector 3. The photoelectric transmitter LD and the photoelectric receiver PD are connected to the mono-mode optical fiber 1 via a coupler 4. The mono-mode optical fiber and the multi-mode optical fiber are connected by welding.

The mono-mode optical fiber can only transmit lights in a fundamental mode, and based on this characteristic of the mono-mode optical fiber, a laser output by a laser device enters the mono-mode optical fiber via the coupler. The mono-mode optical fiber also serves as a communication optical fiber. The multi-mode optical fiber is welded to a tail end of the mono-mode optical fiber to serve as a vibration sensor optical fiber. The reflector is connected to a tail end of the multi-mode optical fiber, so that the laser can return along an original path when reaching the tail end of the multi-mode optical fiber.

As the mono-mode optical fiber can only transmit lights in the fundamental mode, a light entering the multi-mode optical fiber from the mono-mode optical fibers will be emitted still in the fundamental mode; when the multi-mode optical fiber bends, the light turns into a high-order mode to be transmitted in the multi-mode optical fiber from the fundamental model; when transmitted to the tail end of the multi-mode optical fiber, the light is reflected back by the reflector (as shown in FIG. 1) and is transmitted still in the high-order mode; and when transmitted to the mono-mode optical fiber, the light will be no longer in the fundamental mode and cannot reach the photoelectric receiver PD via the mono-mode optical fiber. In the case where the multi-mode optical fiber is disturbed, the light in the high-order mode turns into the fundamental mode under the vibration of the multi-mode optical fiber when transmitted to the mono-mode optical fiber, so that a light signal is detected by the photoelectric receiver PD, and the light detected by the photoelectric receiver PD varies with the vibration of the multi-mode optical fiber. When the multi-mode optical fiber stops vibrating, a straight line is output by the photoelectric receiver PD. Thus, output signals of the photoelectric receiver PD are vibration envelopes in a certain optical relation with external vibration.

The foregoing embodiments are only specific ones of the invention, and the protection scope of the invention is not limited to these illustrative embodiments. Various equivalent modifications or substitutes easily achieved by any skilled in this field based on the technical solutions of the invention should also fall within the protection scope of the invention.

Thus, the protection scope of the invention is subject to the protection scope defined by the claims.

The invention claimed is:

1. A warning device for preventing underground cables against accidental excavation, comprising:
    an optical fiber vibration sensor having a mode recognition function, wherein an output of the optical fiber vibration sensor varies with a vibration intensity and frequency;
    a signal processing unit;
    a wireless communication unit; and
    a power supply unit,
    wherein the signal processing unit is connected to the optical fiber vibration sensor, the wireless communication unit and the power supply unit,
    the optical fiber vibration sensor is installed along a cable and is configured to monitor vibration signals around the cable and the signal processing unit is configured provide an alarm based on the vibration intensity and frequency, and
    the optical fiber vibration sensor comprises a photoelectric transmitter LD, a photoelectric receiver PD, a mono-mode optical fiber, a multi-mode optical fiber and a reflector, the mono-mode optical fiber has an end connected to the photoelectric transmitter LD and the photoelectric receiver PD and an end connected to one end of the multi-mode optical fiber, and the multi-mode optical fiber has an end connected to the reflector.

2. The warning device for preventing underground cables against accidental excavation according to claim 1, wherein the optical fiber vibration sensor having the mode recognition function is a mode-conversion optical fiber vibration sensor.

3. The warning device for preventing underground cables against accidental excavation according to claim 1, wherein the photoelectric transmitter LD and the photoelectric receiver PD are connected to the mono-mode optical fiber via a coupler.

4. The warning device for preventing underground cables against accidental excavation according to claim 1, wherein the mono-mode optical fiber and the multi-mode optical fiber are connected by welding.

5. The warning device for preventing underground cables against accidental excavation according to claim 1, wherein a light entering the multi-mode optical fiber from the mono-mode optical fiber is emitted in a fundamental mode; however, when the multi-mode optical fiber bends, the light turns into a high-order mode to be transmitted in the multi-mode optical fiber from the fundamental mode; when transmitted to a tail end of the multi-mode optical fiber, the light is reflected back by the reflector and is transmitted still in the high-order mode; when transmitted to the mono-mode optical fiber, the light is no longer in the fundamental mode and does not reach the photoelectric receiver PD via the mono-mode optical fiber; in a case where multi-mode optical fiber is disturbed, the light in the high-order mode turns into the fundamental mode when transmitted to the mono-mode optical fiber, so that a light signal is detected by the photoelectric receiver PD, and the light detected by the photoelectric receiver PD varies with vibration of the multi-mode optical fiber; and when the multi-mode optical fiber stops vibrating, a straight line is output by the photoelectric receiver PD.

* * * * *